W. M. TOVEY.
DISINFECTING DEVICE.
APPLICATION FILED FEB. 11, 1911.

1,009,868.

Patented Nov. 28, 1911.

Witnesses

Inventor

UNITED STATES PATENT OFFICE.

WILLIAM MATTHEWS TOVEY, OF MONTREAL, QUEBEC, CANADA, ASSIGNOR OF ONE-HALF TO THOMAS EDWARD PRICE, OF MONTREAL, CANADA.

DISINFECTING DEVICE.

1,009,868.     Specification of Letters Patent.     Patented Nov. 28, 1911.

Application filed February 11, 1911. Serial No. 607,955.

*To all whom it may concern:*

Be it known that I, WILLIAM MATTHEWS TOVEY, resident of 27 St. Mark street, in the city and district of Montreal, in the Province of Quebec, in the Dominion of Canada, a subject of the King of Great Britain, have invented certain new and useful Improvements in Disinfecting Devices; and I do hereby declare that the following is a full, clear, and exact description of the same.

The invention relates to improvements in a disinfecting device, as described in the present specification and illustrated in the accompanying drawings that form part of the same.

The invention consists essentially in inclosing a disinfectant in a sealed jar of which the wall and bottom are pervious to water.

The objects of the invention are to provide a clean and wholesome means of disinfecting chambers in dwellings and elsewhere, and generally to devise a simple and cheap arrangement, which shall not be objectionable to the senses.

Figure 1:
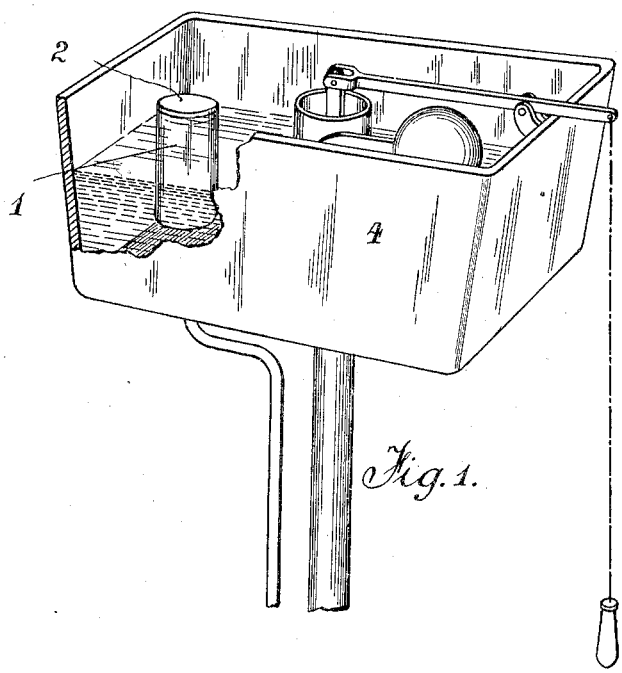
Figure 2:
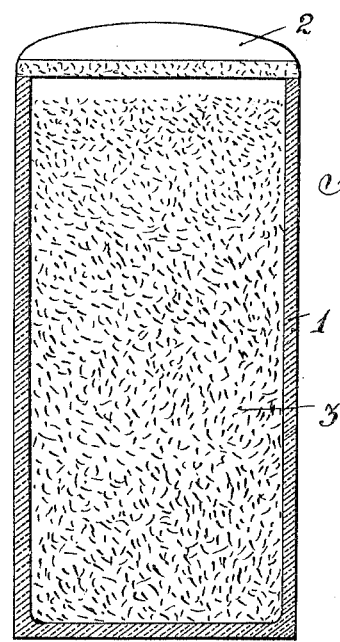

In the drawings, Figure 1 is a perspective view of a cistern of a water flushing system, showing the wall broken away and the disinfectant jar therewithin. Fig. 2 is an enlarged sectional perspective view of the device.

Like numerals of reference indicate corresponding parts in each figure.

Referring to the drawings, 1 is a jar of any suitable shape or size open at the top and formed of a material pervious to water, such as plaster of Paris, and 2 is a cement cover cemented to the top of the wall of the jar and impervious to water.

3 is a permanganate of potash substance inclosed in the jar 1.

4 is a cistern of a water flushing system.

In the use of this article, the jar is filled with the disinfectant such as permanganate of potash and securely sealed by the cover 2. The jar is then placed in a receptacle containing water such as the cistern 4 and the water in the receptacle gradually percolates through the wall of the jar 1 therein mixing with the disinfecting substance. The water with substance also percolates the wall until the said wall and bottom of the jar are thoroughly impregnated with the disinfectant, so that on drawing the water away from the cistern and renewing the supply as customary, the fresh supply of water will immediately receive its charge of disinfectant from the impregnated wall of the jar. This will continue with each new supply of water, until the disinfectant within the jar is exhausted and this will not occur for quite a long time.

What I claim as my invention is:

1. In a disinfecting device for use in flushing cisterns, a jar having an imperforate body constructed of material pervious to water and containing a solid water-soluble disinfecting substance, and an impervious cover closing said jar and having a liquid-tight union therewith.

2. In a disinfecting device for use in flushing cisterns, an imperforate plaster-of-Paris jar containing a solid water-soluble disinfecting substance, and an impervious cement cover closing said jar and having a liquid-tight union therewith.

Signed in the city and district of Montreal, Quebec, Canada, this sixteenth day of January, 1911.

WILLIAM MATTHEWS TOVEY.

Witnesses:
  G. H. TRESIDDER,
  H. E. PLANTE, Jr.